(12) United States Patent
Guo et al.

(10) Patent No.: US 9,663,252 B1
(45) Date of Patent: May 30, 2017

(54) METHOD FOR ATTITUDE CONTROLLING BASED ON FINITE TIME FRICTION ESTIMATION FOR FLEXIBLE SPACECRAFT

(71) Applicant: Beihang University, Beijing (CN)

(72) Inventors: Lei Guo, Beijing (CN); Peixi Zhang, Beijing (CN); Jianzhong Qiao, Beijing (CN); Yukai Zhu, Beijing (CN); Jianwei Xu, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 15/371,622

(22) Filed: Dec. 7, 2016

(51) Int. Cl.
*B64G 1/36* (2006.01)
*B64G 1/28* (2006.01)
*B64G 1/24* (2006.01)
*F16F 15/30* (2006.01)

(52) U.S. Cl.
CPC ........ *B64G 1/283* (2013.01); *B64G 2001/245* (2013.01); *F16F 15/30* (2013.01)

(58) Field of Classification Search
CPC .... B64G 1/283; B64G 2001/245; F16F 15/30
USPC .................... 701/13, 531; 244/164
See application file for complete search history.

(56) References Cited

U.S. PATENT DOCUMENTS

| 2014/0074767 | A1* | 3/2014 | Horwood | B64G 3/00 706/52 |
| 2015/0001345 | A1* | 1/2015 | Polle | B64G 1/26 244/158.6 |

* cited by examiner

*Primary Examiner* — Thomas G Black
*Assistant Examiner* — Luke Huynh
(74) *Attorney, Agent, or Firm* — Locke Lord LLP; Tim Tingkang Xia, Esq.

(57) ABSTRACT

The present invention provides a method for attitude control based on finite time friction estimation for a flexible spacecraft. The control method includes the following steps: a. introducing spacecraft flywheel friction disturbance into a spacecraft dynamics system, and establishing a flexible spacecraft dynamics system with flywheel friction disturbance; b. converting the flexible spacecraft dynamics system with flywheel friction disturbance into a state-space form; c. constructing a flywheel friction disturbance estimator; d. constructing a flexible appendage vibration disturbance observer; and e. combining the flywheel friction disturbance estimator in the step c and the flexible appendage vibration disturbance observer in the step d with a nominal controller to obtain a compound controller; the compound controller compensating for flywheel friction according to an estimated value of a flywheel friction moment; and the compound controller compensating for flexible appendage vibration disturbance according to an estimated value of flexible appendage vibration disturbance.

10 Claims, 2 Drawing Sheets

METHOD FOR ATTITUDE CONTROLLING BASED ON FINITE TIME FRICTION ESTIMATION FOR FLEXIBLE SPACECRAFT

CROSS-REFERENCE TO RELATED APPLICATIONS

This non-provisional application claims priority to and benefit of, under 35 U.S.C. §119(a), Patent Application No. 201610357659.1 filed in P.R. China on May 26, 2016, the entire content of which is hereby incorporated by reference.

FIELD OF THE INVENTION

The present invention relates to the field of astronautic technologies, and more particularly to a method for attitude controlling based on finite time friction estimation for a flexible spacecraft.

BACKGROUND OF THE INVENTION

Spacecraft attitude control system is an important element among various systems of a spacecraft. The precision, stability, and reliability of spacecraft attitude control are key technologies during the research process of spacecrafts. In recent years, spacecrafts need to be responsible for more complex tasks and therefore have a continuously increasing demand for electric power. Accordingly, a larger solar panel is needed in order to meet the demand of the tasks. In addition, as spacecrafts need to perform tasks at a longer distance, the requirements on communication antennas also become increasingly higher, and antennas need to be designed to have a structure as large as possible so as to implement data exchange and communication. These requirements result in increasingly larger appendages of the spacecraft. In terms of the launch costs and the technical implementation difficulty, the above appendages such as solar panels and communication antennas generally adopt low-density, low-rigidity flexible structure designs to ensure that tasks can be completed without adding too much weight to the spacecraft system, so as to ensure that the spacecraft can be launched to a predetermined orbit. However, if a large number of flexible appendages are used, attitude control of the spacecraft body will be affected. Because the flexible structures will incur vibration during motion of the spacecraft body, which will affect the accuracy of spacecraft attitude control.

In addition, because flywheels have such advantages as stable output and long service life, almost all long-life, high-precision, and multi-function satellites that were launched in recent years use flywheels as the main execution component. However, the flywheel has a very distinctive feature, that is, limited by processing conditions, a friction moment is generated when the speed of the flywheel is low and crosses zero, affecting the spacecraft attitude control system. Even in some cases, because the rotational speed of the flywheel repeatedly crosses zero, the flywheel chatters, and causes chattering of the spacecraft body with flexible appendages and further causes chattering of the flexible appendages, making it more difficult to stabilize the spacecraft system and implement high-precision attitude control. Therefore, to precisely implement the spacecraft attitude control, the impact of the above two types of interference needs to be overcome in the spacecraft configuring process.

Therefore, there is a need of a method for attitude controlling based on finite time friction estimation for a flexible spacecraft, which can effectively estimate and compensate for friction disturbance.

SUMMARY OF THE INVENTION

According to one aspect of the present invention, it is to provide a method for attitude controlling based on finite time friction estimation for a flexible spacecraft, the control method comprising the following steps:

a. introducing spacecraft flywheel friction disturbance into a flexible spacecraft dynamics system, and establishing a flexible spacecraft dynamics system $\Sigma_1$ with flywheel friction disturbance;

b. converting the flexible spacecraft dynamics system $\Sigma_1$ with flywheel friction disturbance into a state-space form;

c. constructing a flywheel friction disturbance estimator, the flywheel friction disturbance estimator estimating a value of a flywheel friction moment, wherein the method for constructing the flywheel friction disturbance estimator comprises the following steps:

1) establishing a flywheel dynamics model, the flywheel dynamics model being expressed as:

$$\begin{bmatrix} \dot{\Omega}(t) \\ \dot{M}_f(t) \end{bmatrix} = \begin{bmatrix} -J_w^{-1}(T_c(t) + M_f(t) + D\Omega(t)) \\ \beta\Omega(t)(M_f(t)\mathrm{sign}(\Omega(t)) - M_{f0})^2 \end{bmatrix}$$

wherein $\Omega(t)$ is a rotational speed of a motor in a flywheel, the rotational speed is an angular speed, $\dot{\Omega}(t)$ is an angular acceleration of the motor in the flywheel, $\dot{M}_f(t)$ is a rate of change of the flywheel friction moment, D is a damping coefficient of the flywheel, $J_w$ is rotational inertia of the flywheel, $\beta$ is a bearing rest slope parameter, and $M_{f0}$ is a Coulomb friction moment;

2) constructing the flywheel friction disturbance estimator, the flywheel friction disturbance estimator being expressed as:

$$\begin{bmatrix} \dot{\hat{\Omega}}(t) \\ \dot{\hat{M}}_f(t) \end{bmatrix} = \begin{bmatrix} -J_w^{-1}\left(T_c(t) + D\hat{\Omega}(t) + \hat{M}_f(t)\right) + k_1 e_1(t) + \alpha_1 \mathrm{sgn} e_1(t) \\ k_2 e_1(t) + \alpha_2 \mathrm{sgn}(-\alpha_1 J_w \mathrm{sgn}(e_1(t))) \end{bmatrix}$$

wherein $\hat{\Omega}(t)$ is an estimated value of the rotational speed $\Omega(t)$ of the flywheel, $\hat{M}_f(t)$ is an estimated value of the flywheel friction moment $M_f(t)$, $k_1$, $k_2$, $\alpha_1$, and $\alpha_2$ are parameters, and $e_1(t)=\Omega(t)-\hat{\Omega}(t)$, and wherein the parameters $k_1$ and $k_2$ are determined using a pole assignment method, $k_1$ has a value ranging from 0 to 100, $k_2$ has a value ranging from −80 to 0, and the parameters $\alpha_1$ and $\alpha_2$ are positive constants having a value ranging from 0 to 1;

d. constructing a flexible appendage vibration disturbance observer, the flexible appendage vibration disturbance observer estimating a value of flexible appendage vibration disturbance;

e. combining the flywheel friction disturbance estimator in the step c and the flexible appendage vibration disturbance observer in the step d with a nominal controller to obtain a compound controller; wherein the compound controller is used to compensate for flywheel friction according to the estimated value of the flywheel friction moment; and the compound controller is used to compensate for the flexible appendage vibration disturbance according to the estimated value of the flexible appendage vibration disturbance.

Preferably, the flexible spacecraft dynamics system $\Sigma_1$ with flywheel friction disturbance is expressed as:

$$\Sigma_1 : \begin{cases} J\ddot{\theta}(t) + F\ddot{\eta}(t) = T_c(t) + M_f(t) + T_d(t) \\ \ddot{\eta}(t) + 2\xi\omega\dot{\eta}(t) + \omega^2\eta(t) + F^T\ddot{\theta}(t) = 0 \end{cases}$$

wherein J is rotational inertia of the spacecraft, $\ddot{\theta}(t)$ is an angular acceleration of spacecraft attitude, F is a coupling matrix between the spacecraft attitude and a flexible structure, $\eta(t)$ is a flexible appendage vibration mode, $\ddot{\eta}(t)$ is a second derivative of the flexible appendage vibration mode, $\omega$ is a vibration frequency corresponding to the flexible appendage vibration mode, $\xi$ is damping of the flexible appendage mode, $T_c(t)$ is a control moment resolved by an attitude controller, $M_f(t)$ is the flywheel friction moment, and $T_d(t)$ is a bounded disturbance torque of disturbance of an outer space environment on the spacecraft.

Preferably, the control moment exerted by the flywheel on the spacecraft body is a resultant moment of the control moment resolved by the controller and the flywheel friction moment, the control moment exerted by the flywheel on the spacecraft body being expressed as:

$$T_r(t) = T_c(t) + M_f(t)$$

wherein $T_r(t)$ is an actual control moment exerted by the flywheel on the spacecraft body.

Preferably, the flexible spacecraft dynamics system $\Sigma_1$ with flywheel friction disturbance is converted into a system $\Sigma_2$ by means of mathematical manipulation: $(J-FF^T)\ddot{\theta}(t)=T_c(t)+M_f(t)+M_I(t)+T_d(t)$, wherein $M_I(t)$ represents vibration disturbance caused by flexible appendage vibration, and $M_I(t)=F(2\xi\omega\dot{\eta}(t)+\omega^2\eta(t))$.

Preferably, $$x(t) = \begin{bmatrix} \theta(t) \\ \dot{\theta}(t) \end{bmatrix}$$

is constructed, and the system $\Sigma_2$ is converted into: $\dot{x}(t)=Ax(t)+B_1(u(t)+M_f(t)+M_I(t))+B_2T_d(t)$, wherein $\theta(t)$ is an attitude angle of the spacecraft, $\dot{\theta}(t)$ is an angular speed of spacecraft attitude, $\dot{x}(t)$ is a derivative of $x(t)$, $$A = \begin{bmatrix} 0 & 1 \\ 0 & 0 \end{bmatrix}$$

is a system matrix, and $$B_1 = B_2 = \begin{bmatrix} 0 \\ (J - FF^T)^{-1} \end{bmatrix}$$

is a control input matrix.

Preferably, a method for constructing the flexible appendage vibration disturbance observer in the step d comprises the following steps of:

(1) establishing a flexible appendage vibration disturbance model, and constructing state variables w(t), W, and V of the flexible appendage vibration disturbance, the state variables of the flexible appendage vibration disturbance satisfying $$w(t) = \begin{bmatrix} \eta(t) \\ \dot{\eta}(t) \end{bmatrix},$$

$$W = \begin{bmatrix} 0 & 1 \\ -R\omega^2 & -2R\xi\omega \end{bmatrix},$$

and $$V = [F\omega^2 \quad 2F\xi\omega],$$

and the flexible appendage vibration disturbance model being expressed as:

$$\begin{cases} M_I(t) = Vw(t) \\ \dot{w}(t) = Ww(t) - H_1u(t) - H_2M_f - H_3T_d \end{cases}$$

wherein $$H_1 = H_2 = H_3 = \begin{bmatrix} 0 \\ RF^TI^{-1} \end{bmatrix},$$

and $R=(1-F^T I^{-1} F)^{-1}$.

(2) constructing the flexible appendage vibration disturbance observer, the flexible appendage vibration disturbance observer is expressed as:

$$\begin{cases} \hat{M}_I(t) = V\hat{\omega}(t) \\ \hat{\omega}(t) = V(t) - Lx(t) \\ \dot{v}(t) = (W + LB_1V)(v(t) - Lx(t)) + LAx(t) + \\ (LB_1 - H_2)\hat{M}_f(t) + (LB_1 - H_1)u(t) \end{cases}$$

wherein v(t) is an auxiliary state variable of the flexible appendage vibration disturbance observer, $\hat{M}_I(t)$ is the estimated value of the flexible appendage vibration disturbance $M_I(t)$, L is a gain matrix of the flexible appendage vibration disturbance observer, and the gain matrix of the flexible appendage vibration disturbance observer satisfies $L=[L_{11} \; L_{12}; L_{21} \; L_{22}; L_{31} L_{32}; L_{41} \; L_{42}]$.

Preferably, the nominal controller is a universal feedback controller, and the nominal controller is expressed as: $u_c(t)=Kx(t)$, wherein K is a gain matrix of the nominal controller, and the gain matrix of the nominal controller satisfies $K=[K_{11}; K_{21}]$; and the compound controller is expressed as: $u(t)=u_c(t)-\hat{M}_I(t)-\hat{M}_f(t)$, wherein $u_c(t)$ is an input of the nominal controller, and u(t) is the control moment exerted on the flywheel.

Preferably, the gain matrix L of the flexible appendage vibration disturbance observer is solved using an LMI toolbox, and the gain matrix K of the nominal controller is solved using an LMI tool.

According to another aspect of the present invention, it is to provide a spacecraft for attitude controlling based on finite time friction estimation, comprising a spacecraft shell, a spacecraft dynamics module, a flywheel friction disturbance estimation module, a flexible appendage vibration disturbance observation module, a compound control module, a central processing unit (CPU), a control unit, and a flexible spacecraft wing flap, wherein the spacecraft dynamics module is used to introduce flywheel friction disturbance into a flexible spacecraft dynamics system;

the flywheel friction disturbance estimation module is used to estimate a value of a flywheel friction moment by the flywheel friction disturbance estimator;

the flexible appendage vibration disturbance observation module is used to estimate a value of a flexible appendage vibration disturbance by the flexible appendage vibration disturbance observer;

the compound control module is used to compensate for the flywheel friction disturbance according to the estimated value of the flywheel friction moment, and to compensate for the flexible appendage vibration disturbance according to the estimated value of the flexible appendage vibration disturbance by the compound controller;

the CPU reads and processes data from the anti-disturbance compound control module;

the control unit performs spacecraft attitude control according to the execution result of the CPU, and adjusts the attitude of the spacecraft by using the compound control module to compensate for the flywheel friction disturbance and the flexible appendage vibration disturbance; and the flexible spacecraft wing flap unfolds at two ends of the spacecraft shell.

The method for attitude controlling based on finite time friction estimation for a flexible spacecraft according to the present invention can quickly track the friction force of the flywheel system, control the friction disturbance of the flexible spacecraft and the vibration disturbance of the flexible appendage, and realize high precision attitude control for the flexible spacecraft system.

In certain aspects, the present invention relates to a spacecraft using the method as described above.

It should be noted that the previous general description and the following specific description are both for illustration and explanation, and are not intended to limit the protection scope of the present invention.

BRIEF DESCRIPTION OF THE DRAWINGS

Further objectives, effects, and advantages of the present invention will become apparent from the following description of the embodiments of the present invention with reference to the accompanying drawings, wherein.

DETAILED DESCRIPTION OF THE INVENTION

Figure 1:
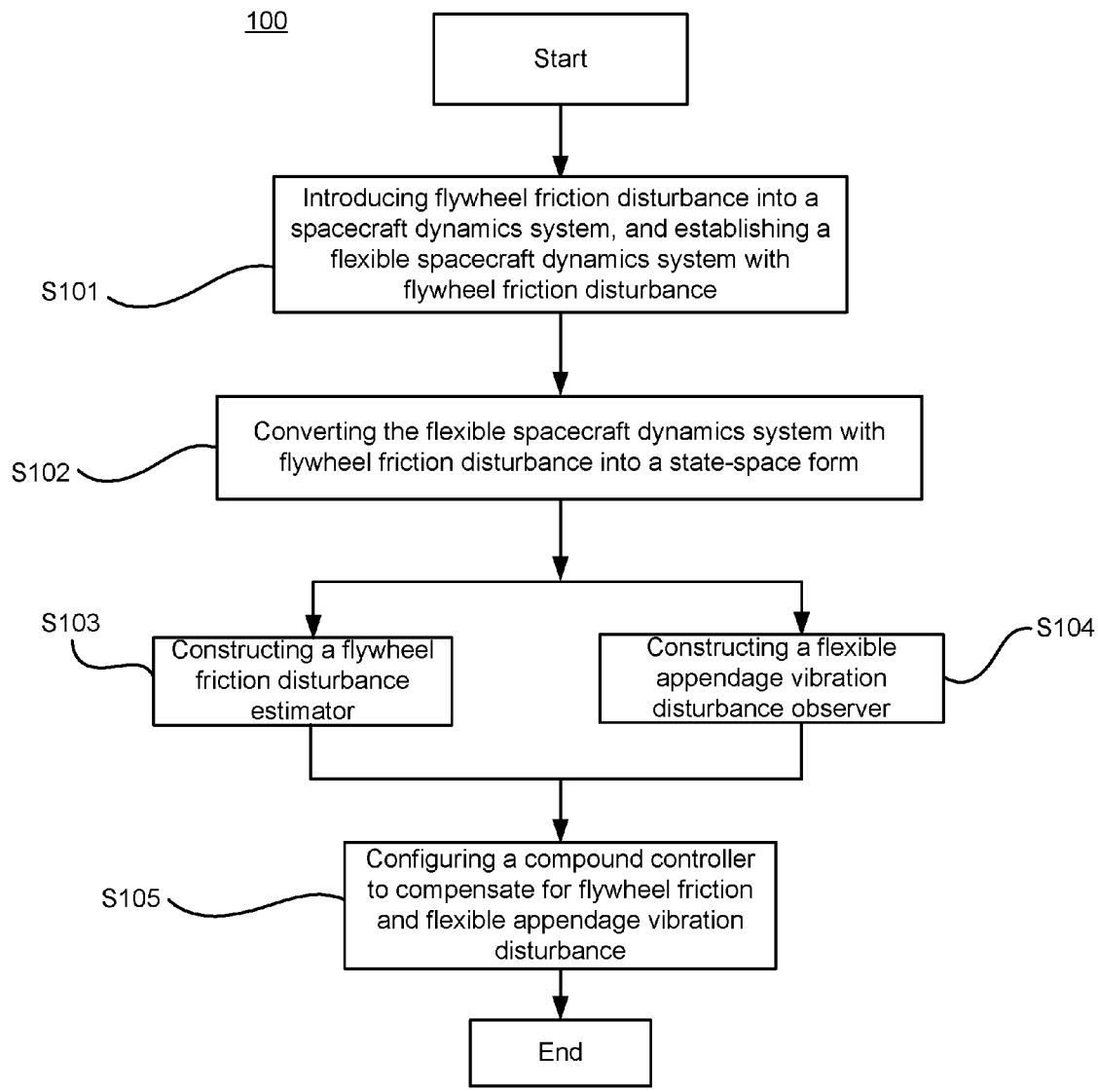
FIG. 1 is a schematic flowchart of a method for attitude controlling based on finite time friction estimation for a flexible spacecraft according to the present invention.

Objects and functions of the present invention as well as methods for realizing these objects and functions will be elucidated with reference to exemplary embodiments. However, the present invention is not limited to the following disclosed exemplary embodiments, but may be implemented in different ways. The description of the invention is merely provided to assist those of ordinary skill in the art in a comprehensive understanding of specific details of the invention in nature.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

Hereinafter, embodiments of the present invention will be described with reference to the drawings. In the drawings, like reference numerals designate like or similar parts or steps.

The present invention provides a method for attitude controlling based on finite time friction estimation for a flexible spacecraft. FIG. 1 is a flowchart of the method for attitude controlling based on finite time friction estimation for a flexible spacecraft according to the present invention. The method 100 for attitude control for a flexible spacecraft in this embodiment comprises steps of introducing flywheel friction disturbance into a flexible spacecraft dynamics system, and establishing a flexible spacecraft dynamics system $\Sigma_1$ with flywheel friction disturbance; constructing a flywheel friction disturbance estimator to estimate a value of a flywheel friction moment; constructing a flexible appendage vibration disturbance observer to estimate a value of flexible appendage vibration disturbance; and configuring a compound controller to compensate for the flywheel friction disturbance and the flexible appendage vibration disturbance according to the estimated value of the flywheel friction moment and the estimated value of the flexible appendage vibration disturbance.

Figure 2:
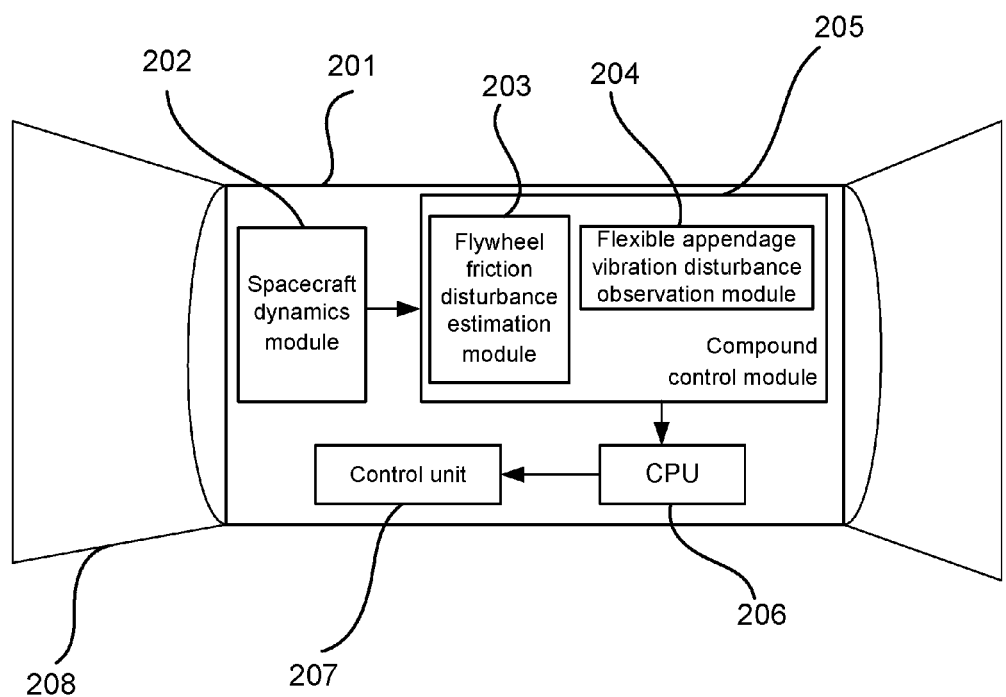
FIG. 2 is a block diagram of a spacecraft for implementing the method for attitude controlling for a flexible spacecraft according to an embodiment of the present invention.

For purpose of description, the method for attitude controlling based on finite time friction estimation for a flexible spacecraft according to the present invention is implemented using different modules. FIG. 2 is a block diagram 200 of a spacecraft implementing the method for attitude control for a flexible spacecraft according to an embodiment of the present invention. Specifically, the spacecraft includes, but not limited to, a spacecraft shell 201, a spacecraft dynamics module 202, a flywheel friction disturbance estimation module 203, a flexible appendage vibration disturbance observation module 204, a compound control module 205, a central processing unit (CPU) 206, a control unit 207, and a flexible spacecraft wing flap 208.

As shown in FIG. 2, the spacecraft dynamics module 202, the flywheel friction disturbance estimation module 203, the flexible appendage vibration disturbance observation module 204, the compound control module 205, the CPU 206, and the control unit 207 are mounted inside the spacecraft shell 201. The flexible spacecraft wing flap 208 unfolds at two ends of the spacecraft shell 201.

The spacecraft dynamics module 202 is used to introduce flywheel friction disturbance into a flexible spacecraft dynamics system.

The flywheel friction disturbance estimation module 203 is used to estimate a value of a flywheel friction moment by the flywheel friction disturbance estimator.

The flexible appendage vibration disturbance observation module 204 is used to estimate a value of a flexible appendage vibration disturbance by the flexible appendage vibration disturbance observer.

The compound control module 205 is used to compensate for the flywheel friction disturbance according to the estimated value of the flywheel friction moment, and to compensate for the flexible appendage vibration disturbance according to the estimated value of the flexible appendage vibration disturbance by the compound controller.

The CPU 206 reads and processes data from the anti-disturbance compound control module 205.

The control unit 207 performs spacecraft attitude control according to the execution result of the CPU 206. Specifically, the control unit 207 adjusts the attitude of the spacecraft by using the compound control module 205 to compensate for the flywheel friction disturbance and the flexible appendage vibration disturbance.

The method for attitude control for a flexible spacecraft according to this embodiment is specifically described below with reference to FIG. 1.

Step S101: Introducing flywheel friction disturbance into a spacecraft dynamics system, and establishing a flexible spacecraft dynamics system $\Sigma_1$ with flywheel friction disturbance.

A flywheel system for spacecraft attitude control is an independent electromechanical execution component. The flywheel system is not only under the action of the electromagnetic driving moment of a flywheel motor, but also is influenced by the bearing friction force. A control moment exerted by the flywheel on the spacecraft body is a resultant moment of a control moment resolved by the controller and the flywheel friction moment, and is specifically expressed as $T_r(t) = T_c(t) + M_f(t)$, wherein $T_r(t)$ is an actual control moment exerted by the flywheel on the spacecraft body, $T_c(t)$ is a control moment resolved by an attitude controller, and $M_f(t)$ is the flywheel friction moment. Considering the influence of the friction force on attitude control, a flexible spacecraft dynamics system $\Sigma_1$ with flywheel friction disturbance is established, specifically expressed as:

$$\Sigma_1 : \begin{cases} J\ddot{\theta}(t) + F\ddot{\eta}(t) = T_c(t) + M_f(t) + T_d(t) \\ \ddot{\eta}(t) + 2\xi\omega\dot{\eta}(t) + \omega^2\eta(t) + F^T\ddot{\theta}(t) = 0 \end{cases}$$

wherein J is rotational inertia of the spacecraft, $\ddot{\theta}(t)$ is an angular acceleration of spacecraft attitude, F is a coupling matrix between the spacecraft attitude and a flexible structure, $\eta(t)$ is a flexible appendage vibration mode, $\ddot{\eta}(t)$ is a second derivative of the flexible appendage vibration mode, $\omega$ is a vibration frequency corresponding to the flexible appendage vibration mode, $\xi$ is damping of the flexible appendage mode, $T_c(t)$ is the control moment resolved by the attitude controller, $M_f(t)$ is the flywheel friction moment, and $T_d(t)$ is a bounded disturbance torque of disturbance of an outer space environment on the spacecraft.

Step S102: Converting the flexible spacecraft dynamics system with flywheel friction disturbance into a state-space form.

The flexible spacecraft dynamics system $\Sigma_1$ with flywheel friction disturbance is converted into a system $\Sigma_2$ by means of mathematical manipulation: $(J - FF^T)\ddot{\theta}(t) = T_c(t) + M_f(t) + M_{f'}(t) + T_d(t)$, wherein $M_{f'}(t)$ represents vibration disturbance caused by flexible appendage vibration, and $M_{f'}(t) = F(2\xi\omega\dot{\eta}$ (t) $+ \omega^2\eta(t))$. The disturbance on the spacecraft caused by flexible appendage vibration is introduced into the system $\Sigma_2$.

$$x(t) = \begin{bmatrix} \theta(t) \\ \dot{\theta}(t) \end{bmatrix}$$

is constructed, and the system $\Sigma_2$ is converted into a state-space form: $\dot{x}(t) = Ax(t) + B_1(u(t) + M_f(t) + M_{f'}(t)) + B_2 T_d(t)$, wherein $\theta(t)$ is an attitude angle of the spacecraft, $\dot{\theta}(t)$ is an angular speed of spacecraft attitude, $\dot{x}(t)$ is a derivative of $x(t)$, $$A = \begin{bmatrix} 0 & 1 \\ 0 & 0 \end{bmatrix}$$

is a system matrix, and $$B_1 = B_2 = \begin{bmatrix} 0 \\ (J - FF^T)^{-1} \end{bmatrix}$$

is a control input matrix.

Step S103: Constructing a flywheel friction disturbance estimator to estimate a value of a flywheel friction disturbance moment.

In the step 101 of this embodiment, the flywheel friction disturbance is introduced into the spacecraft dynamics system, and the flywheel friction disturbance moment needs to be estimated in order to implement precise spacecraft attitude control. In the present invention, a flywheel friction disturbance estimator is constructed to estimate the flywheel friction disturbance moment.

In addition, in some embodiments, the friction moment $M_f(t)$ of the flywheel system is a solid friction moment of a bearing. In some embodiments, the friction moment $M_f(t)$ of the flywheel system is a viscous friction moment caused by lubrication. In some other embodiments, the friction moment $M_f(t)$ of the flywheel system includes, but not limited to, a solid friction moment of a bearing and a viscous friction moment caused by lubrication. Generally, the solid friction moment of the bearing and the viscous friction moment caused by lubrication are both related to the rotational speed of the flywheel.

The flywheel system has a low-speed friction characteristic. Considering the low-speed friction characteristic of the flywheel system, a flywheel friction disturbance estimator is constructed. A method for constructing the flywheel friction disturbance estimator in this embodiment is described below in detail:

1) establishing a flywheel dynamics model, the flywheel dynamics model being expressed as:

$$\begin{bmatrix} \dot{\Omega}(t) \\ \dot{M}_f(t) \end{bmatrix} = \begin{bmatrix} -J_w^{-1}(T_c(t) + M_f(t) + D\Omega(t)) \\ \beta\Omega(t)(M_f(t)\text{sign}(\Omega(t)) - M_{f0})^2 \end{bmatrix}$$

wherein $\Omega(t)$ is a rotational speed of a motor in a flywheel, the rotational speed is an angular speed, $\dot{\Omega}(t)$ is an angular acceleration of the motor in the flywheel, $\dot{M}_f(t)$ is a rate of change of the flywheel friction moment, D is a damping coefficient of the flywheel, $J_w$ is rotational inertia of the flywheel, $\beta$ is a bearing rest slope parameter, and $M_{f0}$ is a Coulomb friction moment;

2) constructing the flywheel friction disturbance estimator, the flywheel friction disturbance estimator being expressed as:

$$\begin{bmatrix} \dot{\hat{\Omega}}(t) \\ \dot{\hat{M}}_f(t) \end{bmatrix} = \begin{bmatrix} -J_w^{-1}(T_c(t) + D\hat{\Omega}(t) + \hat{M}_f(t)) + k_1 e_1(t) + \alpha_1 \text{sgn} e_1(t) \\ k_2 e_1(t) + \alpha_2 \text{sgn}(-\alpha_1 J_w \text{sgn}(e_1(t))) \end{bmatrix}$$

wherein $\hat{\Omega}(t)$ is an estimated value of the rotational speed $\Omega(t)$ of the flywheel, $\hat{M}_f(t)$ is an estimated value of the flywheel friction moment $M_f(t)$, $k_1$, $k_2$, $\alpha_1$, and $\alpha_2$ are parameters, and $e_1(t)=\Omega(t)-\hat{\Omega}(t)$. By appropriately selecting the parameters $k_1$, $k_2$, $\alpha_1$, and $\alpha_2$, the estimated value $\hat{\Omega}(t)$ of the rotational speed of the flywheel and the estimated value $\hat{M}_f(t)$ of the flywheel friction moment are made to converge at $\Omega(t)$ and $M_f(t)$ in finite time. The parameters $k_1$ and $k_2$ are determined using a pole assignment method, $k_1$ has a value ranging from 0 to 100, $k_2$ has a value ranging from −80 to 0, and the parameters $\alpha_1$ and $\alpha_2$ are positive constants having a value ranging from 0 to 1.

The flywheel friction moment is estimated by using the flywheel friction disturbance estimator constructed in this embodiment of the present invention.

Step S104: Constructing a flexible appendage vibration disturbance observer to estimate a value of flexible appendage vibration disturbance.

Considering the disturbance on the spacecraft attitude caused by flexible appendages, a flexible appendage vibration disturbance observer is constructed to estimate the flexible appendage vibration disturbance. A method for constructing the flexible appendage vibration disturbance observer in this embodiment includes the following steps:

(1) establishing a flexible appendage vibration disturbance model, and constructing state variables w(t), W, and V of the flexible appendage vibration disturbance, the state variables of the flexible appendage vibration disturbance satisfying $$w(t) = \begin{bmatrix} \eta(t) \\ \dot{\eta}(t) \end{bmatrix},$$

$$W = \begin{bmatrix} 0 & 1 \\ -R\omega^2 & -2R\xi\omega \end{bmatrix},$$

and $$V = [F\omega^2 \ 2F\xi\omega],$$

and the flexible appendage vibration disturbance model being expressed as:

$$\begin{cases} M_l(t) = Vw(t) \\ \dot{w}(t) = Ww(t) - H_1 u(t) - H_2 M_f - H_3 T_d \end{cases}$$

wherein $$H_1 = H_2 = H_3 = \begin{bmatrix} 0 \\ RF^T I^{-1} \end{bmatrix},$$

and $R=(1-F^T I^{-1} F)^{-1}$;

(2) constructing the flexible appendage vibration disturbance observer, the flexible appendage vibration disturbance observer is expressed as:

$$\begin{cases} \hat{M}_l(t) = V\hat{\omega}(t) \\ \hat{\omega}(t) = v(t) - Lx(t) \\ \dot{v}(t) = (W + LB_1 V)(v(t) - Lx(t)) + LAx(t) + \\ \quad (LB_1 - H_2)\hat{M}_f(t) + (LB_1 - H_1)u(t) \end{cases}$$

wherein v(t) is an auxiliary state variable of the flexible appendage vibration disturbance observer, $\hat{M}_l(t)$ is the estimated value of the flexible appendage vibration disturbance $M_l(t)$, L is a gain matrix of the flexible appendage vibration disturbance observer, and the gain matrix of the flexible appendage vibration disturbance observer satisfies L=[$L_{11}$ $L_{12}$; $L_{21}$ $L_{22}$; $L_{31}$ $L_{32}$; $L_{41}$ $L_{42}$], and the gain matrix L of the flexible appendage vibration disturbance observer is solved using an LMI toolbox.

In this embodiment, the spacecraft the flexible appendage vibration disturbance is estimated by using the flexible appendage vibration disturbance observer.

Step S105: Configuring a compound controller to compensate for the flywheel friction and the flexible appendage vibration disturbance.

A universal feedback controller is used as a nominal controller, and the nominal controller being specifically expressed as: $u_c(t)=Kx(t)$, wherein K is a gain matrix of the nominal controller, the gain matrix of the nominal controller satisfies K=[$K_{11}$; $K_{21}$] and the gain matrix K of the nominal controller is solved using an LMI tool. The nominal controller is combined with the flywheel friction disturbance estimator and the flexible appendage vibration disturbance observer to obtain a compound controller, the compound controller being specifically expressed as: $u(t)=u_c(t)-\hat{M}_l-\hat{M}_f$ wherein $u_c(t)$ is an input of the nominal controller, u(t) is the control moment exerted on the flywheel, that is, the moment resolved by the attitude controller, and $u(t)=T_c(t)$.

On the basis of a standard controller, the compound controller compensates for the flywheel friction disturbance according to the estimated value $\hat{M}_f(t)$ of the flywheel friction moment. On the basis of the nominal controller, the compound controller compensates for the flexible appendage vibration disturbance according to the estimated value $\hat{M}_l(t)$ of the flexible appendage vibration disturbance. By appropriately selecting the parameters $k_1$, $k_2$, $\alpha_1$, and $\alpha_2$, the estimated value $\hat{M}_f(t)$ of the flywheel friction moment is made to converge at $M_f(t)$ in finite time. The estimated value $\hat{M}_l(t)$ of the flexible appendage vibration disturbance obtained by the flexible appendage vibration disturbance observer is determined by solving the gain matrix L.

The method for attitude controlling based on finite time friction estimation for a flexible spacecraft, which can rapidly track the friction force of a flywheel system and control flexible spacecraft friction disturbance and flexible appendage vibration disturbance, thereby implementing high-precision attitude control of the flexible spacecraft system.

In certain aspects, the present invention relates to a spacecraft using the method as described above.

Based on the description and practice of the present invention as disclosed herein, other embodiments of the present invention are readily conceived of and understood to those skilled in the art. The description and embodiments are provided for exemplary purpose only, the real scope and spirit of the present invention are defined by the claims.

Other embodiments will be conceivable and understood by those skilled in the art upon consideration of this description or from practice of the invention disclosed herein. The description and embodiments are merely exemplary, and the true scope and spirit are intended to be defined by the claims.

What is claimed is:

1. A method for attitude controlling based on finite time friction estimation for a flexible spacecraft, the control method comprising the following steps:
   a) introducing spacecraft flywheel friction disturbance into a flexible spacecraft dynamics system, and establishing a flexible spacecraft dynamics system $\Sigma_1$ with flywheel friction disturbance;
   b) converting the flexible spacecraft dynamics system $\Sigma_1$ with flywheel friction disturbance into a state-space form;
   c) constructing a flywheel friction disturbance estimator, the flywheel friction disturbance estimator estimating a value of a flywheel friction moment, wherein the method for constructing the flywheel friction disturbance estimator comprises the following steps:
   1) establishing a flywheel dynamics model, the flywheel dynamics model being expressed as:

$$\begin{bmatrix} \dot{\Omega}(t) \\ \dot{M}_f(t) \end{bmatrix} = \begin{bmatrix} -J_w^{-1}(T_c(t) + M_f(t) + D\Omega(t)) \\ \beta\Omega(t)(M_f(t)\mathrm{sign}(\Omega(t)) - M_{f0})^2 \end{bmatrix}$$

wherein $\Omega(t)$ is a rotational speed of a motor in a flywheel, the rotational speed is an angular speed, $\dot{\Omega}(t)$ is an angular acceleration of the motor in the flywheel, $\dot{M}_f(t)$ is a rate of change of the flywheel friction moment, D is a damping coefficient of the flywheel, $J_w$ is rotational inertia of the flywheel, $\beta$ is a bearing rest slope parameter, and $M_{f0}$ is a Coulomb friction moment;

2) constructing the flywheel friction disturbance estimator, the flywheel friction disturbance estimator being expressed as:

$$\begin{bmatrix} \dot{\hat{\Omega}}(t) \\ \dot{\hat{M}}_f(t) \end{bmatrix} = \begin{bmatrix} -J_w^{-1}(T_c(t) + D\hat{\Omega}(t) + \hat{M}_f(t)) + k_1 e_1(t) + \alpha_1 \mathrm{sgn} e_1(t) \\ k_2 e_1(t) + \alpha_2 \mathrm{sgn}(-\alpha_1 J_w \mathrm{sgn}(e_1(t))) \end{bmatrix}$$

wherein $\hat{\Omega}(t)$ is an estimated value of the rotational speed $\Omega(t)$ of the flywheel, $\hat{M}_f(t)$ is an estimated value of the flywheel friction moment $M_f(t)$, $k_1$, $k_2$, $\alpha_1$, and $\alpha_2$ are parameters, and $e_1(t) = \Omega(t) - \hat{\Omega}(t)$, and wherein the parameters $k_1$ and $k_2$ are determined using a pole assignment method, $k_1$ has a value ranging from 0 to 100, $k_2$ has a value ranging from $-80$ to 0, and the parameters $\alpha_1$ and $\alpha_2$ are positive constants having a value ranging from 0 to 1;

d) constructing a flexible appendage vibration disturbance observer, the flexible appendage vibration disturbance observer estimating a value of flexible appendage vibration disturbance;

e) combining the flywheel friction disturbance estimator in the step c and the flexible appendage vibration disturbance observer in the step d with a nominal controller to obtain a compound controller; wherein the compound controller is used to compensate for flywheel friction according to the estimated value of the flywheel friction moment; and the compound controller is used to compensate for the flexible appendage vibration disturbance according to the estimated value of the flexible appendage vibration disturbance to perform spacecraft attitude control.

2. The control method according to claim 1, wherein the flexible spacecraft dynamics system $\Sigma_1$ with flywheel friction disturbance is expressed as:

$$\Sigma_1 : \begin{cases} J\ddot{\theta}(t) + F\ddot{\eta}(t) = T_c(t) + M_f(t) + T_d(t) \\ \ddot{\eta}(t) + 2\xi\omega\dot{\eta}(t) + \omega^2\eta(t) + F^T\ddot{\theta}(t) = 0 \end{cases}$$

wherein J is rotational inertia of the spacecraft, $\ddot{\theta}(t)$ is an angular acceleration of spacecraft attitude, F is a coupling matrix between the spacecraft attitude and a flexible structure, $\eta(t)$ is a flexible appendage vibration mode, $\ddot{\eta}(t)$ is a second derivative of the flexible appendage vibration mode, $\omega$ is a vibration frequency corresponding to the flexible appendage vibration mode, $\xi$ is damping of the flexible appendage mode, $T_c(t)$ is a control moment resolved by an attitude controller, $M_f(t)$ is the flywheel friction moment, and $T_d(t)$ is a bounded disturbance torque of disturbance of an outer space environment on the spacecraft.

3. The control method according to claim 2, wherein the control moment exerted by the flywheel on the spacecraft body is a resultant moment of the control moment resolved by the controller and the flywheel friction moment, the control moment exerted by the flywheel on the spacecraft body being expressed as:

$$T_r(t) = T_c(t) + M_f(t)$$

wherein $T_r(t)$ is an actual control moment exerted by the flywheel on the spacecraft body.

4. The control method according to claim 1, wherein the flexible spacecraft dynamics system $\Sigma_1$ with flywheel friction disturbance is converted into a system $\Sigma_2$ by means of mathematical manipulation:

$(J-FF^T)\ddot{\theta}(t) = T_c(t) + M_l(t) + M_f(t) + T_d(t)$, wherein $M_l(t)$ represents vibration disturbance caused by flexible appendage vibration, and $M_l(t) = F(2\xi\omega\dot{\eta}(t) + \omega^2\eta(t))$.

5. The control method according to claim 4, wherein $$x(t) = \begin{bmatrix} \theta(t) \\ \dot{\theta}(t) \end{bmatrix}$$

is constructed, and the system $\Sigma_2$ is converted into:
$\dot{x}(t) = Ax(t) + B_1(u(t) + M_l(t) + M_f(t)) + B_2 T_d(t)$, wherein $\theta(t)$ is an attitude angle of the spacecraft, $\dot{\theta}(t)$ is an angular speed of spacecraft attitude, $\dot{x}(t)$ is a derivative of $x(t)$, $$A = \begin{bmatrix} 0 & 1 \\ 0 & 0 \end{bmatrix}$$

is a system matrix, and $$B_1 = B_2 = \begin{bmatrix} 0 \\ (J - FF^T)^{-1} \end{bmatrix}$$

is a control input matrix.

6. The control method according to claim 1, wherein a method for constructing the flexible appendage vibration disturbance observer in the step d comprises the following steps of:

(1) establishing a flexible appendage vibration disturbance model, and constructing state variables w(t), W, and V of the flexible appendage vibration disturbance, the state variables of the flexible appendage vibration disturbance satisfying $$w(t) = \begin{bmatrix} \eta(t) \\ \dot{\eta}(t) \end{bmatrix},$$

$$W = \begin{bmatrix} 0 & 1 \\ -R\omega^2 & -2R\xi\omega \end{bmatrix},$$

and $$V = [\, F\omega^2 \quad 2F\xi\omega \,],$$

and the flexible appendage vibration disturbance model being expressed as:

$$\begin{cases} M_l(t) = Vw(t) \\ \dot{w}(t) = Ww(t) - H_1 u(t) - H_2 M_f - H_3 T_d \end{cases}$$

wherein $$H_1 = H_2 = H_3 \begin{bmatrix} 0 \\ RF^T I^{-1} \end{bmatrix},$$

and $R = (1 - F^T I^{-1} F)^{-1}$;

(2) constructing the flexible appendage vibration disturbance observer, the flexible appendage vibration disturbance observer is expressed as:

$$\begin{cases} \hat{M}_l(t) = V\hat{\omega}(t) \\ \hat{\omega}(t) = v(t) - Lx(t) \\ \dot{v}(t) = (W + LB_1 V)(v(t) - Lx(t)) + LAx(t) + \\ \qquad (LB_1 - H_2)\hat{M}_f(t) + (LB_1 - H_1)u(t) \end{cases}$$

wherein v(t) is an auxiliary state variable of the flexible appendage vibration disturbance observer, $\hat{M}_l(t)$ is the estimated value of the flexible appendage vibration disturbance $M_l(t)$, L is a gain matrix of the flexible appendage vibration disturbance observer, and the gain matrix of the flexible appendage vibration disturbance observer satisfies $L = [L_{11} L_{12}; L_{21} L_{22}; L_{31} L_{32}; L_{41} L_{42}]$.

7. The control method according to claim 1, wherein the nominal controller is a universal feedback controller, and the nominal controller is expressed as: $u_c(t) = Kx(t)$, wherein K is a gain matrix of the nominal controller, and the gain matrix of the nominal controller satisfies $K = [K_{11}; K_{21}]$; and the compound controller is expressed as: $u(t) = u_c(t) - \hat{M}_l(t) - \hat{M}_f(t)$, wherein $u_c(t)$ is an input of the nominal controller, and u(t) is the control moment exerted on the flywheel.

8. The control method according to claim 6, wherein the gain matrix L of the flexible appendage vibration disturbance observer is solved using an LMI toolbox, and the gain matrix K of the nominal controller is solved using an LMI tool.

9. A spacecraft for attitude controlling based on finite time friction estimation, comprising a spacecraft shell, a spacecraft dynamics module, a flywheel friction disturbance estimation module, a flexible appendage vibration disturbance observation module, a compound control module, a central processing unit (CPU), a control unit, and a flexible spacecraft wing flap, wherein the spacecraft dynamics module is used to introduce flywheel friction disturbance into a flexible spacecraft dynamics system;

the flywheel friction disturbance estimation module is used to estimate a value of a flywheel friction moment by the flywheel friction disturbance estimator;

the flexible appendage vibration disturbance observation module is used to estimate a value of a flexible appendage vibration disturbance by the flexible appendage vibration disturbance observer;

the compound control module is used to compensate for the flywheel friction disturbance according to the estimated value of the flywheel friction moment, and to compensate for the flexible appendage vibration disturbance according to the estimated value of the flexible appendage vibration disturbance by the compound controller;

the CPU reads and processes data from the anti-disturbance compound control module;

the control unit performs spacecraft attitude control according to the execution result of the CPU, and adjusts the attitude of the spacecraft by using the compound control module to compensate for the flywheel friction disturbance and the flexible appendage vibration disturbance; and the flexible spacecraft wing flap unfolds at two ends of the spacecraft shell.

10. A spacecraft using the method of claim 1.

* * * * *